(12) United States Patent
Zaleski et al.

(10) Patent No.: US 11,535,571 B2
(45) Date of Patent: Dec. 27, 2022

(54) ENVIRONMENTAL BARRIER COATING FOR ENHANCED RESISTANCE TO ATTACK BY MOLTEN SILICATE DEPOSITS

(71) Applicant: United Technologies Corportion, Farmington, CT (US)

(72) Inventors: Elisa M. Zaleski, Manchester, CT (US); Richard Wesley Jackson, Groton, CT (US); Xia Tang, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1169 days.

(21) Appl. No.: 15/998,731

(22) Filed: Aug. 16, 2018

(65) Prior Publication Data

US 2020/0056489 A1    Feb. 20, 2020

(51) Int. Cl.
| | |
|---|---|
| *F01D 5/28* | (2006.01) |
| *C04B 41/87* | (2006.01) |
| *C04B 41/00* | (2006.01) |
| *C04B 41/50* | (2006.01) |
| *C04B 41/85* | (2006.01) |

(52) U.S. Cl.
CPC ............ *C04B 41/87* (2013.01); *C04B 41/009* (2013.01); *C04B 41/5015* (2013.01); *C04B 41/5024* (2013.01); *C04B 41/85* (2013.01); *F01D 5/288* (2013.01); *F05D 2220/32* (2013.01); *F05D 2240/12* (2013.01); *F05D 2240/30* (2013.01); *F05D 2300/222* (2013.01); *F05D 2300/6033* (2013.01); *F05D 2300/611* (2013.01)

(58) Field of Classification Search
None
See application file for complete search history.

(56) References Cited

U.S. PATENT DOCUMENTS

| | | |
|---|---|---|
| 5,113,582 A | 5/1992 | Monson et al. |
| 5,580,837 A | 12/1996 | Dodds et al. |
| 5,858,181 A | 1/1999 | Jindal et al. |
| 6,117,560 A | 9/2000 | Maloney |
| 6,210,182 B1 | 4/2001 | Hasz et al. |
| 6,228,453 B1 | 5/2001 | Fareed et al. |
| 6,270,852 B1 | 8/2001 | Ulion et al. |
| 6,284,323 B1 | 9/2001 | Maloney |
| 6,296,941 B1 | 10/2001 | Eaton, Jr. et al. |
| 6,579,636 B2 | 6/2003 | Ogur et al. |

(Continued)

FOREIGN PATENT DOCUMENTS

| | | |
|---|---|---|
| DE | 102015205807 A1 | 10/2016 |
| EP | 1044944 A1 | 10/2000 |

(Continued)

OTHER PUBLICATIONS

U.S. Non-Final Office Action dated Mar. 11, 2020 for corresponding U.S. Appl. No. 15/998,736.

(Continued)

*Primary Examiner* — Michael Lebentritt
(74) *Attorney, Agent, or Firm* — Bachman & LaPointe, P.C.

(57) ABSTRACT

An environmental barrier coating, comprising a substrate containing silicon; an environmental barrier layer applied to said substrate; said environmental barrier layer comprising a rare earth composition.

5 Claims, 1 Drawing Sheet

(56) References Cited

U.S. PATENT DOCUMENTS

| | | | |
|---|---|---|---|
| 6,730,422 B2 | 5/2004 | Litton et al. | |
| 6,924,040 B2 | 8/2005 | Maloney | |
| 7,063,894 B2 | 6/2006 | Sun et al. | |
| 7,226,672 B2 | 6/2007 | Litton et al. | |
| 7,509,735 B2 | 3/2009 | Philip et al. | |
| 7,513,955 B2 | 4/2009 | Krüger et al. | |
| 7,622,195 B2 | 11/2009 | Schlichting et al. | |
| 7,862,901 B2 | 1/2011 | Darolia et al. | |
| 7,951,459 B2 | 5/2011 | Tang et al. | |
| 7,972,657 B2 | 7/2011 | Schlichting et al. | |
| 8,039,113 B2 | 10/2011 | Kirby et al. | |
| 8,062,759 B2 | 11/2011 | Fu et al. | |
| 8,084,086 B2 | 12/2011 | Hass et al. | |
| 8,111,078 B1 | 2/2012 | Yang et al. | |
| 8,119,247 B2 | 2/2012 | Kirby et al. | |
| 8,216,689 B2 | 7/2012 | Witz et al. | |
| 8,217,087 B1 | 7/2012 | Keller et al. | |
| 8,257,559 B2 | 9/2012 | Floyd et al. | |
| 8,273,470 B2 | 9/2012 | Kirby et al. | |
| 8,287,635 B2 | 10/2012 | Luccarelli et al. | |
| 8,343,589 B2 | 1/2013 | Kirby et al. | |
| 8,357,454 B2 | 1/2013 | Kulkarni et al. | |
| 8,470,460 B2 | 6/2013 | Lee | |
| 8,512,874 B2 | 8/2013 | Darolia et al. | |
| 8,529,999 B2 | 9/2013 | Maloney et al. | |
| 8,574,721 B2 | 11/2013 | Gero et al. | |
| 8,658,255 B2 | 2/2014 | Kirby et al. | |
| 8,658,291 B2 | 2/2014 | Kirby et al. | |
| 8,663,378 B2 | 3/2014 | Luccarelli et al. | |
| 8,673,400 B2 | 3/2014 | Kirby et al. | |
| 8,940,417 B2 | 1/2015 | Courcot et al. | |
| 9,034,479 B2 | 5/2015 | Nagaraj et al. | |
| 9,126,873 B2 | 9/2015 | Diss et al. | |
| 9,387,512 B2 | 7/2016 | Lee et al. | |
| 9,428,650 B2 | 8/2016 | Meschter et al. | |
| 9,611,181 B2 | 4/2017 | Tang et al. | |
| 9,713,912 B2 | 7/2017 | Lee | |
| 9,771,811 B2 | 9/2017 | Zhang et al. | |
| 9,926,238 B2 | 3/2018 | Louchet et al. | |
| 9,938,839 B2 | 4/2018 | Rosenzweig et al. | |
| 9,951,630 B2 | 4/2018 | Hass | |
| 2006/0099358 A1* | 5/2006 | Raybould | C04B 41/009 428/34.4 |
| 2006/0110609 A1* | 5/2006 | Eaton | C23C 30/00 428/701 |
| 2006/0115659 A1 | 6/2006 | Hazel et al. | |
| 2007/0292616 A1* | 12/2007 | Hazel | C23C 28/3455 427/337 |
| 2008/0113218 A1* | 5/2008 | Schlichting | C23C 28/345 428/701 |
| 2009/0155554 A1 | 6/2009 | Gentleman et al. | |
| 2009/0186237 A1* | 7/2009 | Lee | C23C 30/00 428/678 |
| 2010/0129636 A1 | 5/2010 | Cybulsky et al. | |
| 2010/0129673 A1 | 5/2010 | Lee | |
| 2010/0154422 A1 | 6/2010 | Kirby et al. | |
| 2011/0014060 A1 | 1/2011 | Bolcavage et al. | |
| 2011/0217560 A1 | 9/2011 | Ridgeway | |
| 2011/0281107 A1* | 11/2011 | Gero | F01D 5/288 427/576 |
| 2012/0244383 A1* | 9/2012 | Meschter | C23C 28/042 428/428 |
| 2013/0122259 A1 | 5/2013 | Lee | |
| 2013/0260130 A1 | 10/2013 | Taxacher et al. | |
| 2014/0065408 A1* | 3/2014 | Strock | C23C 28/347 427/446 |
| 2014/0272310 A1 | 9/2014 | Lazur et al. | |
| 2015/0111063 A1* | 4/2015 | Khan | C23C 14/025 427/419.7 |
| 2015/0118444 A1 | 4/2015 | Lipkin et al. | |
| 2015/0167141 A1 | 6/2015 | Rozenweig et al. | |
| 2015/0308276 A1 | 10/2015 | Kleinow et al. | |
| 2016/0160664 A1 | 6/2016 | Luthra et al. | |
| 2016/0186580 A1* | 6/2016 | Zaleski | C23C 28/3455 427/454 |
| 2016/0214907 A1 | 7/2016 | Shim et al. | |
| 2016/0332922 A1 | 11/2016 | Tang et al. | |
| 2017/0022113 A1 | 1/2017 | Opila | |
| 2017/0073278 A1 | 3/2017 | Landwehr et al. | |
| 2017/0121232 A1 | 5/2017 | Nelson et al. | |
| 2017/0145560 A1 | 5/2017 | Weaver et al. | |
| 2017/0335118 A1 | 11/2017 | Tang et al. | |
| 2017/0342539 A1* | 11/2017 | Sato | C04B 35/50 |
| 2018/0170811 A1 | 6/2018 | Osada et al. | |
| 2018/0305821 A1* | 10/2018 | Wan | C23C 14/08 |
| 2018/0347049 A1* | 12/2018 | Oboodi | F01D 5/005 |
| 2018/0370862 A1 | 12/2018 | Kirby et al. | |
| 2020/0040746 A1 | 2/2020 | Jackson et al. | |
| 2020/0055788 A1 | 2/2020 | Mikalsen et al. | |
| 2020/0080430 A1 | 3/2020 | Schmidt et al. | |
| 2020/0123071 A1* | 4/2020 | Ndamka | C04B 41/87 |
| 2022/0048828 A1* | 2/2022 | Liu | C04B 41/89 |

FOREIGN PATENT DOCUMENTS

| | | |
|---|---|---|
| EP | 1806431 A2 | 7/2007 |
| EP | 1900848 A2 | 3/2008 |
| EP | 2189504 A1 | 5/2010 |
| EP | 2192098 A1 | 6/2010 |
| EP | 2388354 A1 | 11/2011 |
| EP | 2615250 A1 | 7/2013 |
| EP | 2644747 A1 | 10/2013 |
| EP | 3409653 A1 | 12/2015 |
| EP | 3130577 A1 | 2/2017 |
| EP | 3162783 A1 | 5/2017 |
| EP | 3954806 A1 | 2/2022 |
| WO | 2013103425 A2 | 7/2013 |
| WO | 2014204480 A1 | 12/2014 |
| WO | 2017031163 A1 | 2/2017 |
| WO | 20190269023 A1 | 4/2019 |

OTHER PUBLICATIONS

U.S. Non-Final Office Action dated Jul. 17, 2019 issued in U.S. Appl. No. 15/998,736.

European Search Repod dated Dec. 6, 2019 issued for corresponding European Patent Application No. 19189903.8.

European Search Repod dated Jan. 7, 2020 issued for corresponding European Patent Application No. 19192131.1.

European Search Report dated Jan. 13, 2020 issued for corresponding European Patent Application No. 19192162.6.

European Search Report dated Jan. 7, 2020 issued for corresponding European Patent Application No. 19192131.1.

Poerschke, D.L., et al., "Interaction of yttrium disilicate environmental barrier coatings with calcium-magnesium-iron alumino-sllicate melts", Acta Materialia, vol. 145, Dec. 19, 2017 pp. 451-461.

Ahlborg, N.L., et al., "Calcium-magnesium aluminosilicate (CMAS) reactions and degradation mechanisms of advanced environmental barrier coatings", Surface & Coatings Technology, vol. 237, (2013) pp. 79-87.

Zhao, H., et al., "Molten silicate reactions with plasma sprayed ytterbium silicate coatings", Surface & Coatings Technology, vol. 288, Jan. 14, 2016, pp. 151-162.

U.S. Non-Final Office Action dated Oct. 31, 2019 issued in U.S. Appl. No. 15/998,736.

EP Search Report dated Sep. 28, 2015 issued for European Patent Application No. 15168227.5.

European Office action dated Mar. 7, 2018 issued for corresponding EP Patent Application No. 15168227.5.

Latka, et al. "Thermal diffusivity and conductivity of yttria stabilized zirconia coatings obtained by suspension plasma spraying", Surface & Coatings Technology 208 (2012), pp. 87-91, (Year 2012).

Fauchals, et al. "Understanding of Suspension DC Plasma Spraying of Finely Structured Coatings for SOFC", IEEE Transactions on Plasma Science, vol. 33, No. 2, Apr. 2005, pp. 920-930. (Year: 2005).

(56) References Cited

OTHER PUBLICATIONS

Qu, et al., "Thermal Conductivity of the gadolinium calcium silicate apatites: Effect of Different Point Defect Types", Acta Materialia vol. 59, (2011), pp. 3841-3850.
U.S. Non-final Office action dated Apr. 13, 2017 issued for corresponding U.S. Appl. No. 14/711,902.
U.S. Non-final Office action dated Aug. 1, 2019 issued for corresponding U.S. Appl. No. 14/711,902.
U.S. Final Office action dated Aug. 23, 2017 issued for corresponding U.S. Appl. No. 14/711,902.
U.S. Final Office action dated Dec. 11, 2019 issued for corresponding U.S. Appl. No. 14/711,902.
European Search Report dated Jan. 3, 2020 issued for corresponding European Patent Application No. 19192124.6.
U.S. Non-final Office action dated Sep. 10, 2020 issued for corresponding U.S. Appl. No. 14/711,902.
U.S. Notice of Allowance dated Nov. 2, 2010 issued for corresponding U.S. Appl. No. 15/998,736.
J. Kolitsch, H.J. Seifert, and F. Aldinger, "Phase Relationships in the Systems RE2O3—Al2O3—SiO2 (RE = Rare Earth Element, Y, and Sc)" Journal of Phase Equilibria, vol. 19, No. 5, 1998.
Nikas, V. et al..(2015) Strong visible light emission from silicon-oxycarbide nanowire arrays prepared by electron beam lithography and reactive ion etching. Journal of Materials Research. 30. 1-8. (Year 2015).
U.S. Office Action dated Mar. 14, 2022 issued for corresponding U.S. Appl. No. 15/998,730.

\* cited by examiner

ENVIRONMENTAL BARRIER COATING FOR ENHANCED RESISTANCE TO ATTACK BY MOLTEN SILICATE DEPOSITS

BACKGROUND

The disclosure relates to an article comprising a substrate containing silicon and an environmental barrier coating (EBC) which functions as a protective environmental barrier coating and inhibits the formation of gaseous species of Si, particularly $Si(OH)_x$ when the article is exposed to a high temperature, aqueous (steam) environment.

Ceramic materials containing silicon and metal alloys containing silicon have been proposed for structures used in high temperature applications as, for example, gas turbine engines, heat exchangers, internal combustion engines, and the like. A particular useful application for these materials is for use in gas turbine engines which operate at high temperatures in steam-laden environments.

It has been found that these silicon containing structures can recess and lose mass as a result of formation of volatile silicon species, particularly $Si(OH)_x$ and SiO when exposed to high temperature, steam-laden environments.

It is believed that the process involves oxidation of the silicon containing structure to form silica on the surface followed by reaction of the silica with steam to form volatile species of silicon such as $Si(OH)_x$. Naturally it would be highly desirable to provide an external barrier coating for silicon containing substrates which would inhibit the formation of volatile silicon species, $Si(OH)_x$ and SiO, and thereby reduce recession and mass loss.

SUMMARY

In accordance with the present disclosure, there is provided an environmental barrier coating, comprising a substrate containing silicon; an environmental barrier layer applied to the substrate; the environmental barrier layer comprising a rare earth composition.

In another and alternative embodiment, the substrate comprises a ceramic matrix composite material.

In another and alternative embodiment, the environmental barrier layer comprises a rare earth apatite.

In another and alternative embodiment, the environmental barrier layer comprises $RE_8Ca_2(SiO_4)^6O_2$.

In another and alternative embodiment, the environmental barrier layer comprises an apatite comprising $Ca_5F(PO_4)_3$.

In another and alternative embodiment, the Ca can be substituted with Mg, Fe, Na, Sr, and Mn.

In another and alternative embodiment, the substrate comprises at least one of a turbine vane and a turbine blade.

In another and alternative embodiment, the environmental barrier coating further comprises a protective layer applied on the environmental barrier coating.

In another and alternative embodiment, the environmental barrier layer comprises an apatite comprising $M^I_4M^{II}_6(SiO_4)_6X_2$ in which $M^I$ are seven-fold coordinated cation sites and $M^{II}$ are nine-fold coordinated cation sites, and X is an anion sites that is distinct from the oxygen within the silica tetrahedral.

In another and alternative embodiment, the RE ions sit on both the $M^I$ and $M^{II}$ sites and Ca sits on the $M^I$ site fitting the formula $RE_8Ca_2(SiO_4)_6O_2$.

In another and alternative embodiment, the apatite further comprises Mg and Fe additions.

In another and alternative embodiment, the apatite comprises $Ca_{2-x-y}Mg_xFe_y$ where $0>x>1$ and $0>y>1$.

In another and alternative embodiment, at least one of Ca, Mg, Fe, Sr, Na, K, Ti, and Zr is combined with the rare earth composition.

Other details of the coating are set forth in the following detailed description and the accompanying drawings wherein like reference numerals depict like elements.

DETAILED DESCRIPTION

Figure 1:
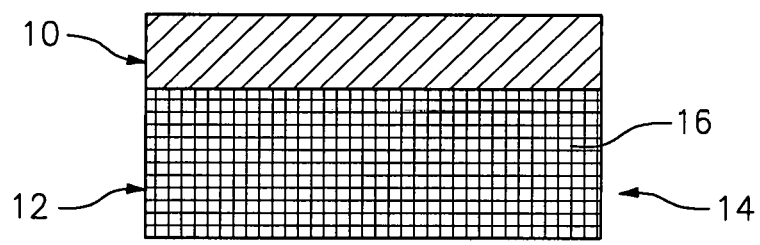
FIG. 1 is a cross section of an exemplary coating on a substrate containing silicon according to the disclosure.

Referring now to FIG. 1, there is illustrated an environmental barrier coating 10 formed over a substrate 12 of an article 14, configured to inhibit the formation of gaseous species of silicon when the article 14 is exposed to a high temperature, aqueous environment. The substrate 12 can be associated with articles 14 such as, at least one of a turbine vane and a turbine blade, and particularly a gas turbine engine component, such as components in the hot section of the gas turbine engine, including static and rotating components and portions of combustors, and the like.

The substrate 12 can be constructed from materials containing silicon and can be a ceramic matrix composite material, a monolithic ceramic, a silicon-based or silicon containing ceramic substrate or a silicon containing metal alloy. In an exemplary embodiment, the substrata 12 can be silicon containing ceramic material such as, for example, silicon carbide, silicon nitride, silicon oxy-nitride and silicon aluminum oxy-nitride, alkaline earth or rare earth silicate glasses or glass ceramics and combinations thereof. Examples can include barium strontium alumino silicate, strontium alumino silicate, lithium alumino silicate, aluminosilicate, mullite, yttrium silicate, ytterbium silicate, and the like. In accordance with a particular embodiment, the silicon containing ceramic substrate comprises a silicon containing matrix with reinforcing materials 16 such as fibers, particles and the like and, more particularly, a silicon based matrix which is fiber-reinforced. Particularly suitable ceramic substrates are a silicon carbide fiber-reinforced silicon carbide matrix, a carbon fiber-reinforced silicon carbide matrix and a silicon carbide fiber-reinforced silicon nitride matrix. Particularly useful silicon-metal alloys for use as substrates for the article 14 can include molybdenum-silicon alloys, niobium-silicon alloys, iron-silicon alloys, zirconium, hafnium, titanium, chromium, tungsten, boron, platinum, tantalum, Ti—Si alloys and Mo—Si, Nb—Si and Fe—Si alloys.

Figure 2:
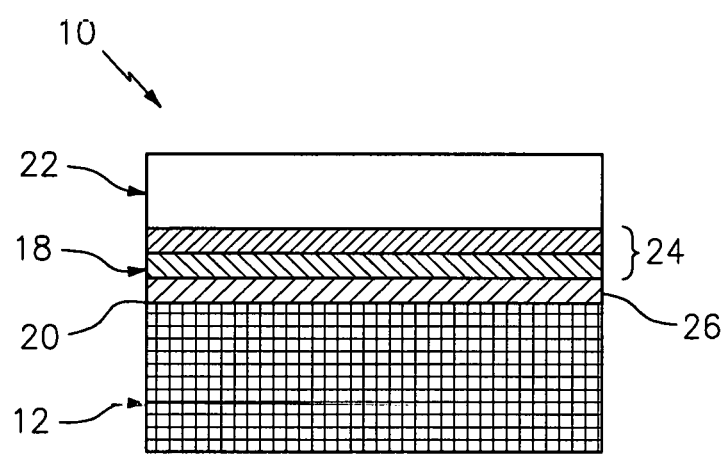
FIG. 2 is a cross section of an exemplary coating on a substrate containing silicon according to the disclosure.

Referring also to FIG. 2, an environmental barrier layer 18 can be applied to the substrate 12 on a surface 20. A protective layer 22 can be applied on the environmental barrier layer 18. The protective layer 22 is configured to resist recession of the Si-containing volatile species when exposed to water vapor or steam. In an exemplary embodiment, the protective layer 22 can include binary or multi-component oxides such as $HfO_2$, $ZrO_2$, or $Gd_2Hf_2O_7$, $Gd_2Zr_2O_7$, refractory metal oxides. In other exemplary embodiments, the protective layer 22 can include silicates with low(er) $SiO_2$ activities. In another exemplary embodiment the protective layer 22 can include (rare earth) RE-monosilicates, disilicates and (alkaline earth) AE alumino silicates, silicates of Hafnium and zirconium.

The environmental barrier layer 18 can include a rare earth (RE) composition, such as rare earth apatites. In an exemplary embodiment the apatite can comprise $M^I_4 M^{II}_6 (SiO_4)_6 X_2$ in which $M^I$ are seven-fold coordinated cation sites and $M^{II}$ are nine-fold coordinated cation sites, and X is an anion sites that is distinct from the oxygen within the silica tetrahedral. In another exemplary embodiment RE ions sit on both the $M^I$ and $M^{II}$ sites while Ca sits on the $M^I$ site fitting the formula $RE_8Ca_2(SiO_4)_6O_2$. Alternatively, the composition may be modified by Mg and Fe additions, to include $Ca_{2-x-y}Mg_xFe_y$ where 0>x>1 and 0>y>1. Such that in the $RE_8(Ca_{2-x-y}Mg_xFe_y)(SiO_4)_6O_2$, the Ca, Mg, Fe composition is chosen to maximize chemical stability with the deposits in which the primary chemical specials are Ca—Mg—Fe—Al—Si—O. Alternatively, elements such as Ca, Mg, Fe, Sr, Na, K, Ti, and Zr may be added with the rare earth elements. Particularly, the environmental barrier layer 18 can include $RE_8Ca_2(SiO_4)_6O_2$. In another exemplary embodiment the environmental barrier layer 18 can include an apatite comprising $Ca_5F(PO_4)_3$. The Ca can be substituted with Mg, Fe, Na, Sr, and Mn. These substitutions can occur in the $RE_8Ca_2(SiO_4)_6O_2$ apatite.

The environmental barrier layer 18 can be present on the substrate 12 at a thickness of greater than or equal to about 0.5 mils (0.0005 inch), preferably between about 3 to about 30 mils and ideally between about 3 to about 5 mils.

The environmental barrier layer 18 can be applied by preparing a surface 20 of the substrate 14. The environmental barrier layer 18 can be applied to the substrate 12 by use of suspension plasma spray, electron-beam physical vapor deposition, or an air plasma spray, as well as, slurry based method including dipping, painting and spraying.

In an alternative embodiment, the environmental barrier coating 10 can be formed as multiple combinations of layers 18. In another alternative embodiment, the environmental barrier layer 18 can be multiple layers 24 of RE based on varying RE concentration. In another alternative embodiment, the environmental barrier coating 10 can be multiple layers of RE based on varying the deposition technique, resulting a varying material properties by layer(s). In an exemplary embodiment the environmental barrier layer 18 can include multiple layers 24 applied by applying a suspension plasma spray layer and then an air plasma spray layer.

In an exemplary embodiment, a bond layer can be added in between the environmental barrier layer 18 and the substrate 12 on top of surface 20 for adhesion and oxidation protection.

An advantage of utilizing the disclosed environmental barrier coating 10 composition that is near equilibrium with the silicate melt can include limited mixing of the silicate melt and the environmental barrier coating 10, thus reducing swelling and phase change in the coating. Another advantage of utilizing the disclosed environmental barrier coating 10 composition that is near equilibrium with the silicate melt can include a limited chemical reaction between the environmental barrier coating 10 and the silicate melt that can result in limited new phase formation. This limitation can decrease the strain induced in the top layer of the coating 10 as a result of a mismatch of coefficient of thermal expansion between the reaction products, thus increasing the life of the coating 10.

There has been provided a coating. While the coating has been described in the context of specific embodiments thereof, other unforeseen alternatives, modifications, and variations may become apparent to those skilled in the art having read the foregoing description. Accordingly, it is intended to embrace those alternatives, modifications, and variations which tall within the broad scope of the appended claims.

What is claimed is:

1. An environmental barrier coating, comprising:
   a substrate containing silicon;
   an environmental barrier layer applied to said substrate;
   said environmental barrier layer comprising a rare earth composition; wherein said environmental barrier layer comprises an apatite comprising $Ca_5F (PO_4)_3$.

2. The environmental barrier coating of claim 1, wherein said substrate comprises a ceramic matrix composite material.

3. The environmental barrier coating of claim 1, wherein said Ca can be substituted with Mg, Fe, Na, Sr, and Mn.

4. The environmental barrier coating of claim 1, wherein said substrate comprises at least one of a turbine vane and a turbine blade.

5. The environmental barrier coating of claim 1, further comprising:
   a protective layer applied on said environmental barrier coating.

* * * * *